United States Patent [19]

Pagano et al.

[11] Patent Number: 5,234,174
[45] Date of Patent: * Aug. 10, 1993

[54] FILM CASSETTE WITH FILM SPEED RELATED INDICATOR

[75] Inventors: Daniel M. Pagano, Henrietta; Stephen H. Miller, Rochester, both of N.Y.

[73] Assignee: Eastman Kodak Company, Rochester, N.Y.

[*] Notice: The portion of the term of this patent subsequent to Jun. 16, 2009 has been disclaimed.

[21] Appl. No.: 880,417

[22] Filed: Jun. 15, 1992

Related U.S. Application Data

[63] Continuation of Ser. No. 679,845, Apr. 3, 1991, abandoned.

[51] Int. Cl.⁵ .............................................. G03B 17/26
[52] U.S. Cl. ................................ 242/71.1; 354/275
[58] Field of Search ........................ 242/71.1, 71.2; 354/275

[56] References Cited

U.S. PATENT DOCUMENTS 4,978,985 12/1990 Smart et al. ...................... 242/71.1
5,049,912 9/1991 Pagano et al. ..................... 242/71.1
5,122,820 6/1992 Pagano et al. ..................... 354/275

Primary Examiner—Daniel P. Stodola
Assistant Examiner—John Q. Nguyen
Attorney, Agent, or Firm—Roger A. Fields

[57] ABSTRACT

A film cassette comprises a spool supported inside a shell for rotation to thrust a filmstrip coiled about the spool to the exterior of the shell whether the filmstrip is unexposed or is partly exposed, and a film exposure status indicator secured to the spool for rotation from an unexposed position for providing a visible indication that the filmstrip is unexposed to respective partly exposed and fully exposed positions for providing visible indications that the filmstrip is only partly exposed or is substantially exposed. A spool lock is supported for movement to arrest the spool with the film exposure status indicator in the unexposed, partly exposed or fully exposed position, and to release the spool. According to the invention, the spool lock includes a film speed indicator for providing a detectable indication of the speed of the filmstrip which is not detectable when the spool lock is arresting the spool and is detectable when the spool lock has released the spool.

11 Claims, 15 Drawing Sheets

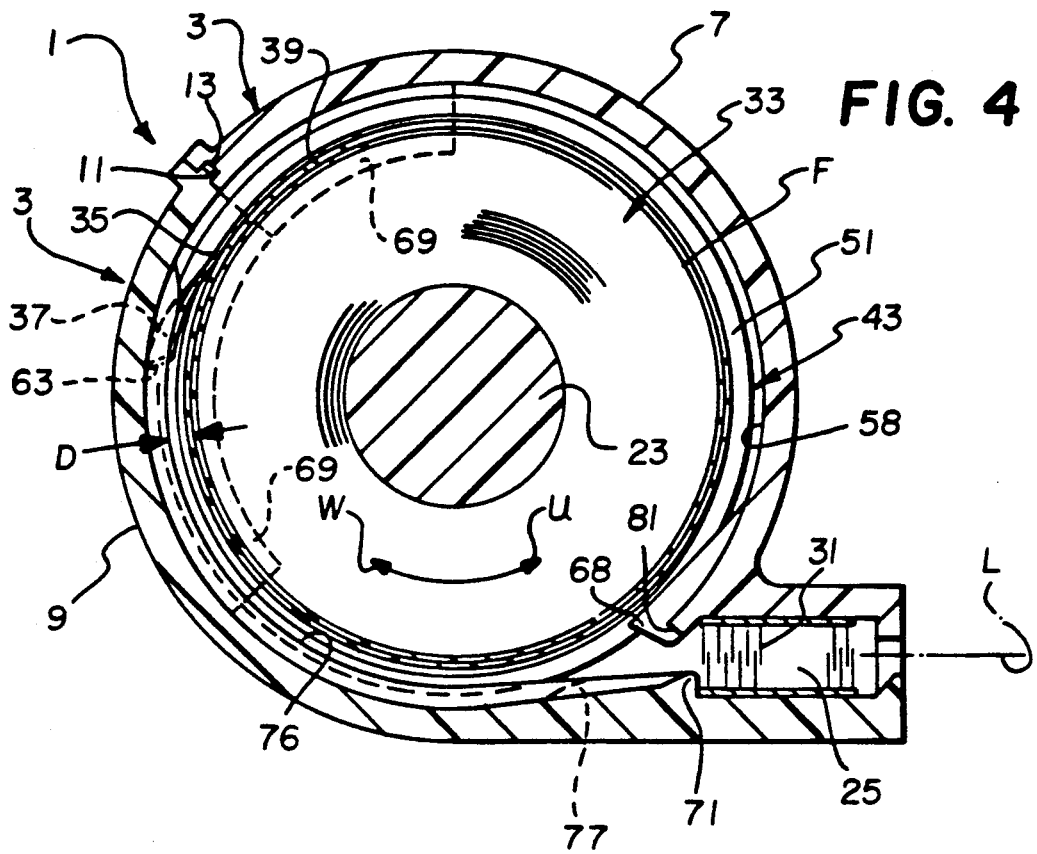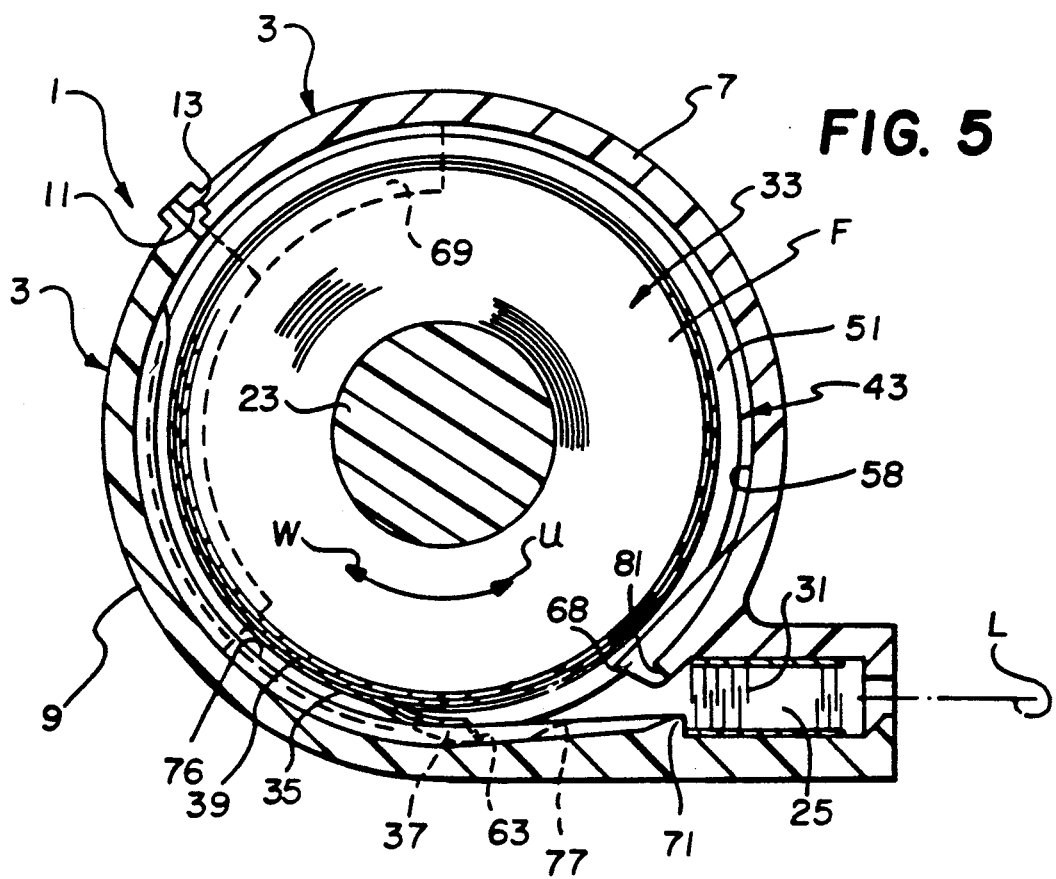

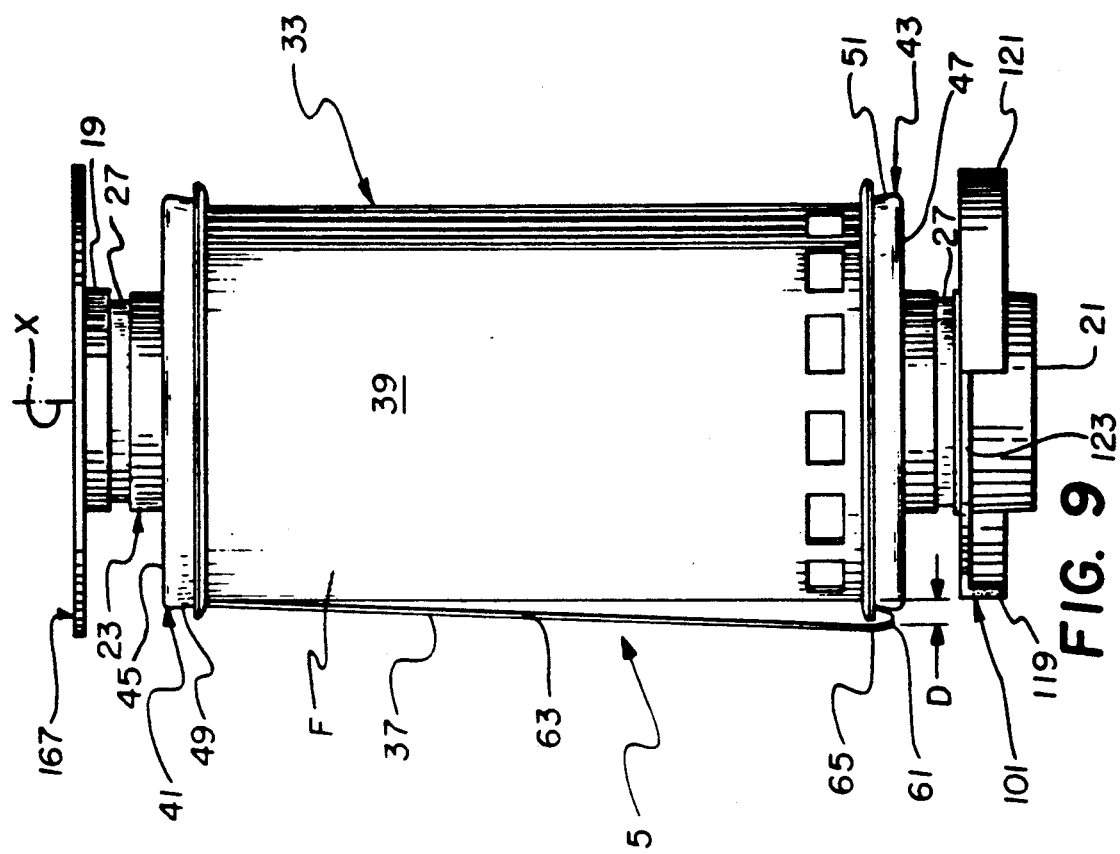
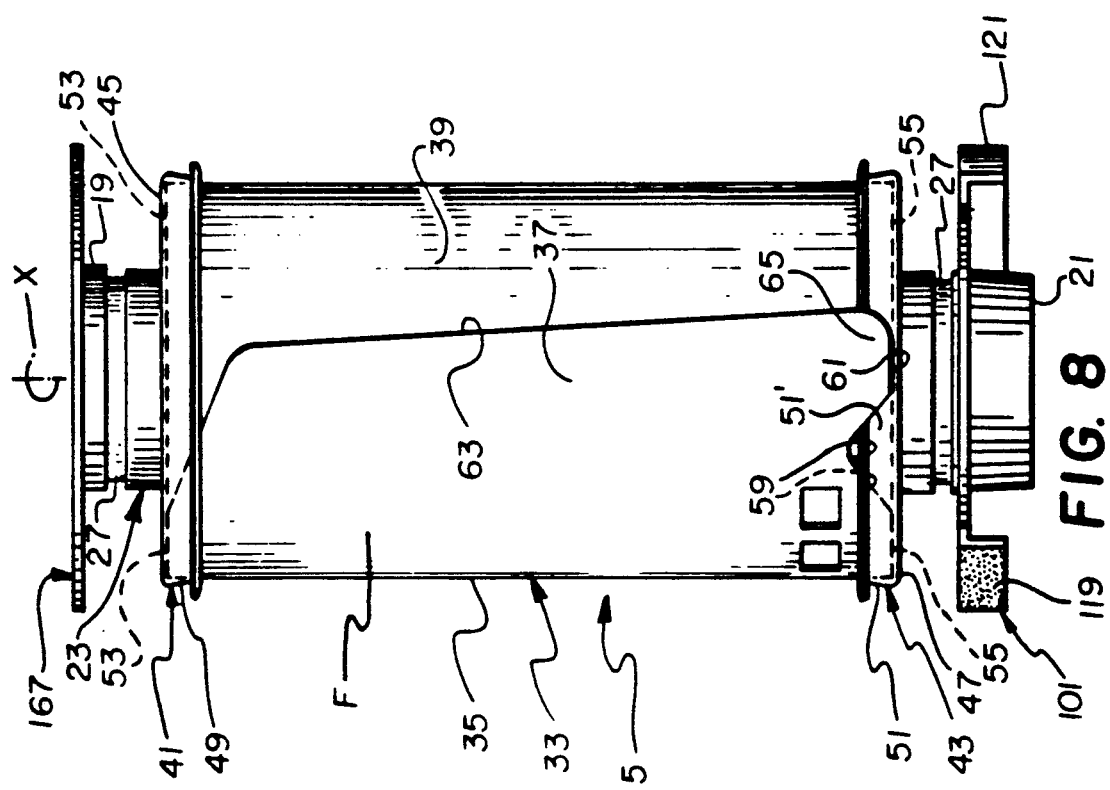

FILM CASSETTE WITH FILM SPEED RELATED INDICATOR

This is a continuation of application Ser. No. 07/679845, filed Apr. 3, 1991, now abandoned.

Reference is made to commonly assigned copending applications Ser. No. 07/596,670, entitled FILM CASSETTE WITH LOCKING MEANS FOR EXPOSURE STATUS INDICATOR, and filed Oct. 11, 1990 in the names of Robert P. Cloutier and Daniel M. Pagano; Ser. No. 07/597,905, entitled CAMERA APPARATUS FOR USE WITH FILM CASSETTE HAVING LOCKING MEANS FOR EXPOSURE STATUS INDICATOR and filed Oct. 11, 1990 in the names of Robert P. Cloutier, Daniel M. Pagano and Patricia A. Dwyer; and Serial No. 07/679846, entitled CAMERA APPARATUS AND METHOD FOR DETECTING FILM SPEED, and filed Apr. 3, 1991 in the names of Daniel M. Pagano and Stephen H. Miller.

BACKGROUND OF THE INVENTION

1. Field of the Invention

The invention relates generally to the field of photography, and in particular to a film cassette having a detectable indication of the speed of a filmstrip housed inside the cassette shell.

2. Description of the Prior Art

In conventional 35 mm film manufacturers' cassettes, such as manufactured by Eastman Kodak Co.and Fuji Photo Film Co. Ltd., the filmstrip is wound on a flanged spool which is rotatably supported within a cylindrical shell. A leading or forwardmost portion of the filmstrip approximately 2⅜ inches long, commonly referred to as a "film leader", normally protrudes from a light-trapped slit or mouth of the cassette shell. One end of the spool has a short axial extension which projects from the shell, enabling the spool to be turned by hand. If the spool is initially rotated in an unwinding direction, the film roll inside the shell will tend to expand radially since the inner end of the filmstrip is attached to the spool, and the fogged leader portion protruding from the slit will remain stationary. The film roll can expand radially until a non-slipping relation is established between its outermost convolution and the inner curved wall of the shell. Once this non-slipping relation exists, there is a binding effect between the film roll and the shell which prevents further rotation of the spool in the unwinding direction. Thus, rotation of the spool in the unwinding direction cannot serve to advance the filmstrip out of the shell, and it is necessary in the typical 35 mm camera to engage the protruding leader portion to draw the filmstrip out of the shell.

A 35 mm film cassette has been proposed which, unlike conventional film cassettes, can be operated to automatically advance a film leader out of the cassette shell by rotating the film spool in the unwinding direction. The film leader is normally non-protruding, i.e. it is located entirely within the cassette shell. Specifically, in U.S. Pat. No. 4,423,943, granted Jan. 3, 1984, there is disclosed a film cassette wherein the outermost convolution of the film roll wound on the film spool is radially constrained by respective circumferential lips of two axially spaced flanges of the spool to prevent the outermost convolution from contacting an inner curved wall of the cassette shell. The trailing end of the filmstrip is secured to the film spool, and the forward or leading end of the filmstrip is slightly tapered purportedly to allow it to freely extend from between the circumferential lips and rest against the shell wall. During initial unwinding rotation of the film spool, the leading end of the filmstrip is advanced to and through a non-lighttight film passageway in order to exit the cassette shell. As a result, all that is needed to advance the filmstrip out of the cassette shell is to rotate the film spool in the unwinding direction. However, according to U.S. Pat. No. 4,423,943, the film cassette is intended to be loaded in a camera only after the non-protruding leader is advanced out of the cassette shell. In the patent, it is suggested that one manually rotate the film spool relative to the cassette shell until the film leader can be manually grasped and attached to a film advancing device in the camera. Thus, the camera is not used to rotate the film spool to advance the film leader from the cassette shell.

More recently, in U.S. Pat. No. 4,834,306, granted May 30, 1989, U.S. Pat. No. 4,846,418, granted Jul. 11, 1989, U.S. Pat. No. 4,848,693, granted Jul. 18, 1989, U.S. Pat. No. 4,875,638, granted Oct. 24, 1989, U.S. Pat. No. 4,887,110, granted Dec. 12, 1989, U.S. Pat. No. 4,894,673, granted Jan. 16, 1990, U.S. Pat. No. 4,899,948, granted Feb. 13, 1990, and U.S. Pat. No. 4,947,197, granted Aug. 7, 1990, there are disclosed other film cassettes wherein a non-protruding leader is advanced automatically out of the cassette shell responsive to rotation of the film spool in an unwinding direction. In those patents, as compared to U.S. Pat. No. 4,423,943, however, there is no suggestion to manually rotate the film spool to expel the film leader.

In conventional 35 mm film manufacturers' cassettes, after the filmstrip is completely exposed, the film spool is rotated in a winding direction to rewind the film leader into the cassette shell. Since the film leader cannot subsequently be advanced out of the cassette shell because of the binding effect that will occur between the film roll and the shell when the film spool is rotated in the unwinding direction, this usually serves as an indication that the filmstrip is completely or partly exposed. Conversely, in the film cassettes disclosed in U.S. Pat. Nos. 4,423,943, 4,834,306, 4,846,418, 4,848,693, 4,875,638, 4,887,110, 4,894,673, 4,899,948, and 4,947,197, the film leader can be automatically advanced out of the cassette shell by rotating the film spool in the unwinding direction. This can be done regardless of whether the filmstrip is unexposed, only partly exposed, or substantially exposed. Some of the film cassettes disclosed in these patents provide no indication as to the exposure status of the filmstrip, others provide some indication of the exposure status.

THE CROSS-REFERENCED APPLICATIONS

The cross-referenced applications each disclose a film cassette capable of advancing a filmstrip out of a light-tight cassette shell whether the filmstrip is unexposed, only partly exposed, or substantially exposed. The film cassette comprises a spool supported within the shell for rotation to thrust a filmstrip coiled about the spool to the exterior of the shell, and a film exposure status indicator secured to the spool for rotation from an unexposed position for providing a visible indication that the filmstrip is unexposed to respective partly exposed and fully exposed positions for providing visible indications that the filmstrip is only partly exposed or is substantially exposed. The spool has three spaced detents arranged at separate radial locations for respective engagement to lock the indicator in its unexposed, partly exposed and fully exposed positions. The shell has a radial slot in which a locking member is movable between a locking position for individually engaging anyone of the detents and a non-locking position for disengaging anyone of the detents. Securement means is arranged at the slot for fixing the shell and the locking member releasably to each other only when the locking member is in its locking and non-locking positions.

SUMMARY OF THE INVENTION

A film cassette comprises a spool supported inside a shell for rotation to thrust a filmstrip coiled about the spool to the exterior of the shell whether the filmstrip is unexposed or is partly exposed, and a film exposure status indicator secured to the spool for rotation from an unexposed position for providing a visible indication that the filmstrip is unexposed to respective partly exposed and fully exposed positions for providing visible indications that the filmstrip is only partly exposed or is substantially exposed. A spool lock is supported for movement to arrest the spool with the film exposure status indicator in the unexposed, partly exposed or fully exposed position, and to release the spool. According to one variation of the invention, the spool lock includes film speed indication means for providing a detectable indication of the speed of the filmstrip that is not detectable when the spool lock is arresting the spool and is detectable when the spool lock has released the spool.

In another variation of the invention, a film cassette comprising a shell for housing filmstrips of various speeds, and film speed indicator means for providing a detectable indication of the speed of a filmstrip housed in the shell, is characterized in that a shield is configured for concealing the film speed indicator means at least to prevent the indicator means from being detected to provide an indication of the speed of a filmstrip housed in the shell and for allowing the indicator means to be moved to reveal the indicator means at least to permit it to be detected to provide the indication. The film speed indicator means is supported for movement relative to the shield between a storage position in which the shield conceals the indicator means and a use position in which the indicator means is revealed.

BRIEF DESCRIPTION OF THE DRAWINGS

FIG. 4 is an end view partly in section of the cassette shell, the film roll and the film spool, illustrating the manner in which the film roll is originally stored on the film spool;

FIGS. 5, 6, and 7 are end views similar to FIG. 4, illustrating the manner in which the film roll is unwound from the film spool;

FIGS. 8 and 9 are elevation views of the film roll and the film spool, illustrating the manner in which the film roll is originally stored on the film spool;

DETAILED DESCRIPTION OF THE PREFERRED EMBODIMENT

The invention is disclosed as being embodied preferably in a 35 mm film cassette and in camera apparatus for use with the film cassette. Because the features of this type of film cassette and camera apparatus are generally well known, the description which follows is directed in particular to elements forming part of or cooperating directly with the disclosed embodiment. It is to be understood, however, that other elements not specifically shown or described may take various forms known to persons of ordinary skill in the art.

The Film Cassette—General

Figure 1:
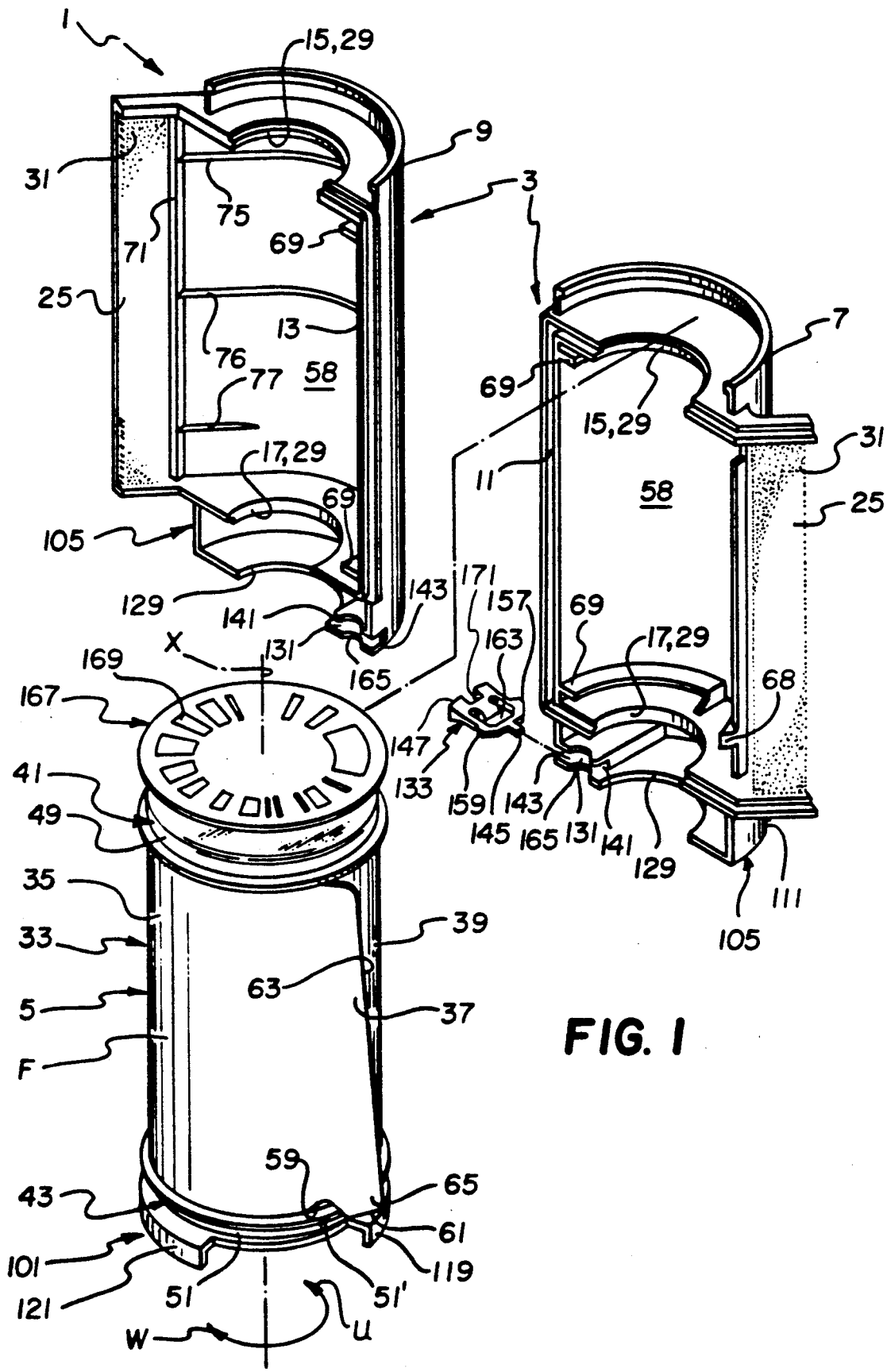
FIG. 1 is an exploded perspective view of a film cassette according to a preferred embodiment of the invention.
Figure 2:
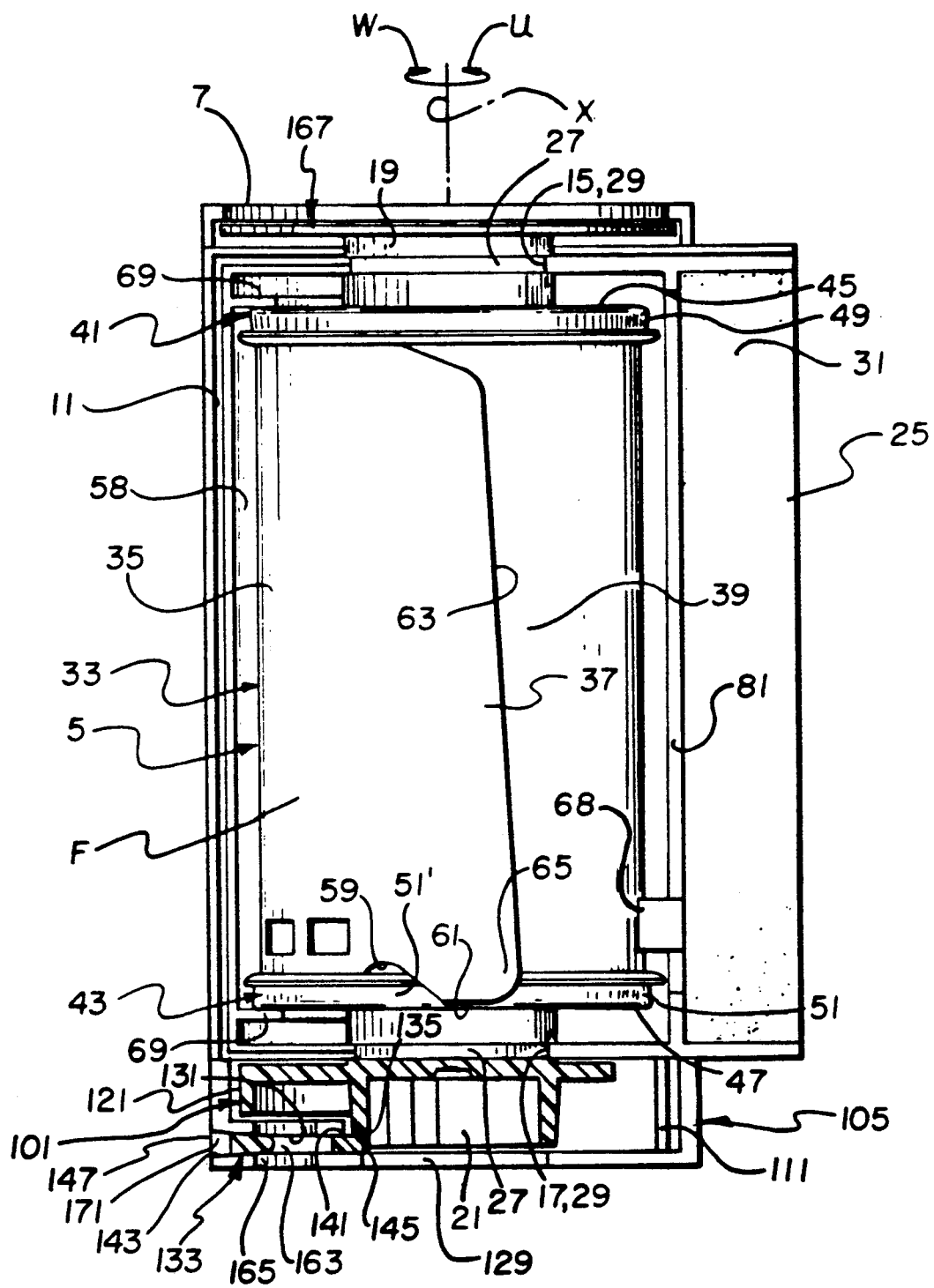
FIG. 2 is an elevation view of the film cassette, illustrating the cassette shell open to reveal a film roll coiled about a film spool.
Figure 12:
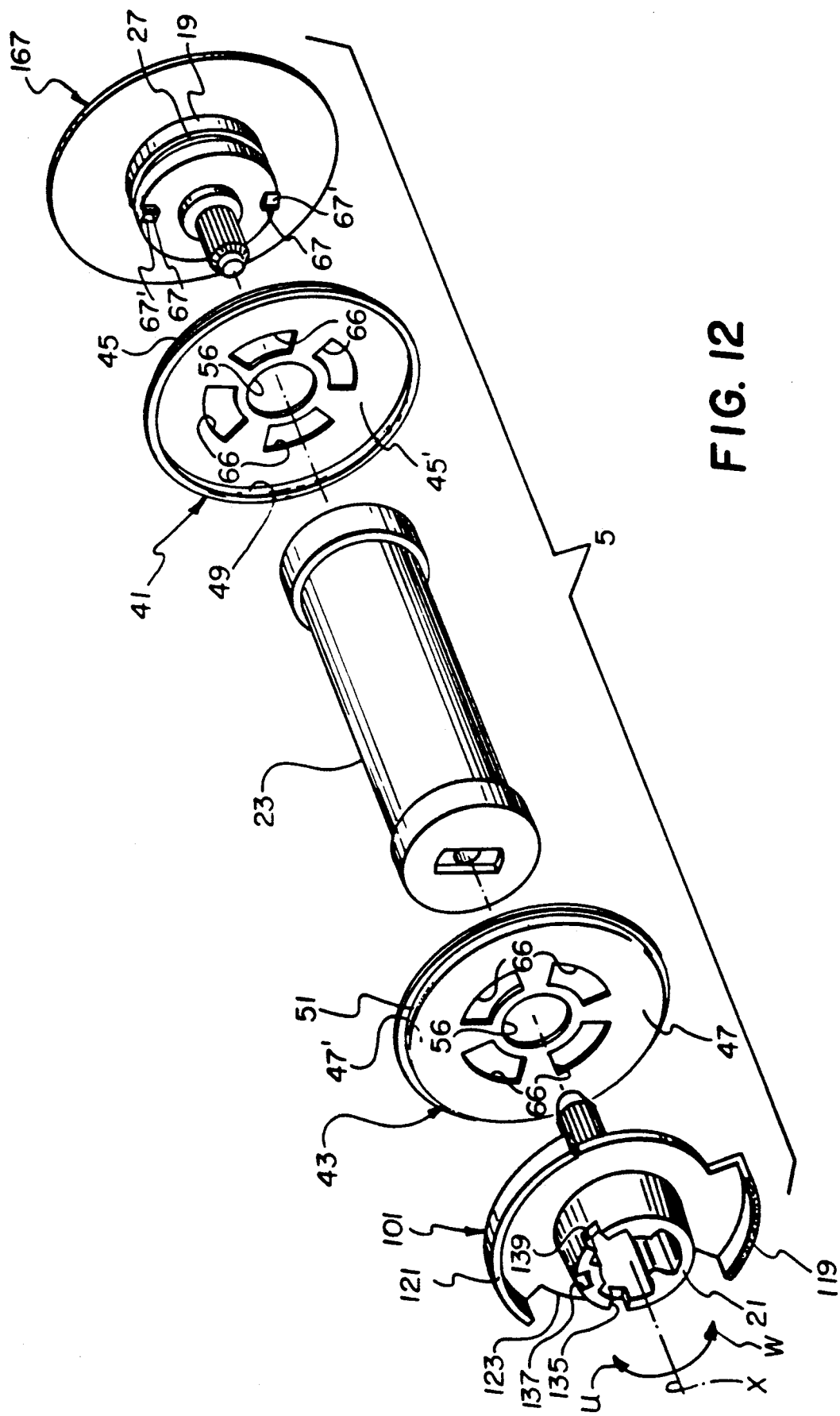
FIG. 12 is an exploded perspective view of the film spool without the film roll.

Referring now to the drawings, FIGS. 1, 2 and 12 depict an improved 35 mm film cassette 1 comprising a light-tight cassette shell 3 and a film spool 5 which is rotatable about an axis X in film unwinding and winding directions U and W within the cassette shell. The cassette shell 3 consists of two shell halves 7 and 9 which are mated along respective grooved and stepped edge portions 11 and 13. The mated halves 7 and 9 define upper and lower aligned circular openings 15 and 17 for a relatively shorter end piece 19 and a longer opposite open-end piece 21 of a spool core or hub 23, and they define a narrow relatively-straight film passageway 25 to the exterior of the cassette shell 3. The shorter end piece 19 and the longer open-end pieces 21 of the spool core 23 each include an annular peripheral groove 27 which mates with a corresponding edge portion 29 of the respective openings 15 and 17 in the cassette shell 3 to rotatably support the film spool 5 for rotation about the axis X in the film unwinding and winding directions U and W. A known black velvet or plush material 31 lines the interior of the film passageway 25 to prevent ambient light from entering the film passageway.

Figure 3:
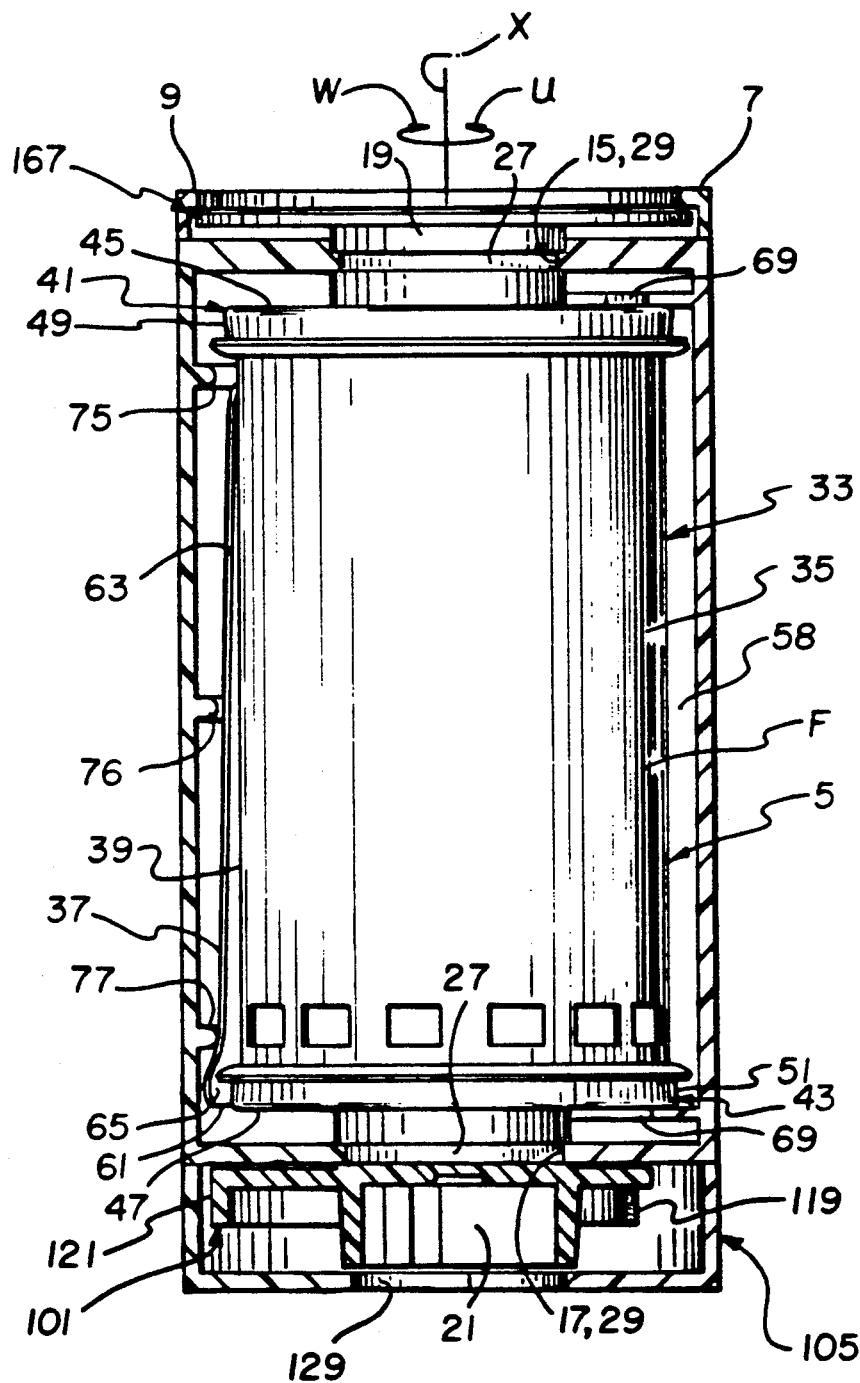
FIG. 3 is an elevation view similar to FIG. 2, through partly in section.

A roll 33 of 35 mm filmstrip F is coiled about the spool core 23 to form successive film convolutions. As shown in FIGS. 2 and 3, the film roll 33 includes an outermost convolution which comprises a film leader 35 having a leading or forward end 37, and it includes a next-inward convolution 39 coiled behind the outermost convolution. The inner or trailing end of an innermost convolution 40 of the film roll 33 is secured to the spool core 23 using known attachment means, not shown. See FIG. 13.

A pair of upper and lower identical, very thin, flexible film constraining flanges 41 and 43 are coaxially spaced along the spool core 23 as shown in FIGS. 1, 2, 8, 12 and 13. The two flanges 41 and 43 comprise respective integral disks 45 and 47 and respective integral annular lips or skirts 49 and 51 which circumferentially extend from the disks. The two disks 45 and 47 cover opposite substantially flat sides of the film roll 33 which are defined by corresponding opposite longitudinal edges 53 and 55 of each successive convolution of the film roll, and they have respective central holes 56 through which the spool core 23 coaxially extends to permit rotation of the spool core relative to the flanges 41 and 43. See FIGS. 12 and 13. Respective circumferential gaps 57 are provided in the spool core 23 for supporting the flanges 41 and 43 at their disks 45 and 47 to permit the flanges to be independently rotated about the axis X. The two gaps 57 are sufficiently spaced from one another along the spool core 23 to maintain respective inner faces 45' and 47' of the disks 45 and 47 slightly spaced from the longitudinal edges 53 and 55 of each successive convolution of the film roll 33. See FIG. 13. The annular lips 49 and 51 overlap the film leader (outermost convolution) 35 of the film roll 33 radially outwardly of the longitudinal edges 53 and 55 of the leader to radially confine the leader to thus prevent it from radially expanding or clock-springing into substantial contact with an interior curved wall 58 of the cassette shell 3. A lip-receiving notch 59 is cut in the film leader (outermost convolution) 35 along its longitudinal edge 55, relatively close to its leading end 37, to receive a peripheral section 51' of the annular lip 51. This allows a relatively short edge-section 61 of the film leader (outermost convolution) 35 connecting the leading end 37 and the notch 59 to overlap the annular lip 51 radially outwardly to thus maintain the leading end spaced a radial distance D from the next-inward convolution 39 of the film roll 33. See FIGS. 4 and 9. The leading end 37 has a forward edge 63 inclined from the longitudinal edge 53 of the film leader (outermost convolution) 35 to the other longitudinal edge 55 of the leader to form a forward-most tip or tab 65 of the leader which, like the edge-section 61, overlaps the annular lip 51 radially outwardly. See FIGS. 1, 2, 8 and 9.

The two flanges 41 and 43 have a plurality of concentric arcuate slots 66 cut in their respective disks 45 and 47 to longitudinally extend in the film unwinding and film winding directions U and W. Engagement means in the form of respective hook-like members 67, located on the shorter and longer open-end pieces 19 and 21 of the spool core 23, are normally located in the concentric slots 66 for movement along the slots into engagement with the flanges 41 and 43 responsive to rotation of the spool core relative to the flanges in the unwinding direction U and for movement along the slots out of engagement with the flanges responsive to rotation of the spool core relative to the flanges in the winding direction W. See FIGS. 12 and 13. Preferably, each of the hook-like members 67 has an end face 67' that is beveled to ease the hook-like member out of one of the concentric slots 66 responsive to rotation of the spool core 23 relative to the flanges 41 and 43 in the winding direction W, in the possible event the spool core is rotated relative to the flanges far enough in the winding direction to back the hook-like member out of the slot.

A film stripper-guide 68 projecting from the interior wall 58 of the cassette half 7 is positioned immediately inward of the inner entrance to the film passageway 25 to be received between the leading end 37 of the film leader (outermost convolution) 35 and the next-inward convolution 39, close to the forward-most tip 65 of the leader, to pick up the leading end and guide it into the film passageway responsive to rotation of the spool core 23 in the unwinding direction U. See FIGS. 1 and 4–7. The leading end 37 will be advanced over the stripper-guide 68 and into the film passageway 25, rather than between the stripper-guide and the next-inward convolution 39, because it is spaced the radial distance D from the latter convolution. Thus, as shown in FIG. 4, the leading end 37 will be located within range of the stripper-guide 68 due to such spacing D from the next-inward convolution 39.

Figure 10:
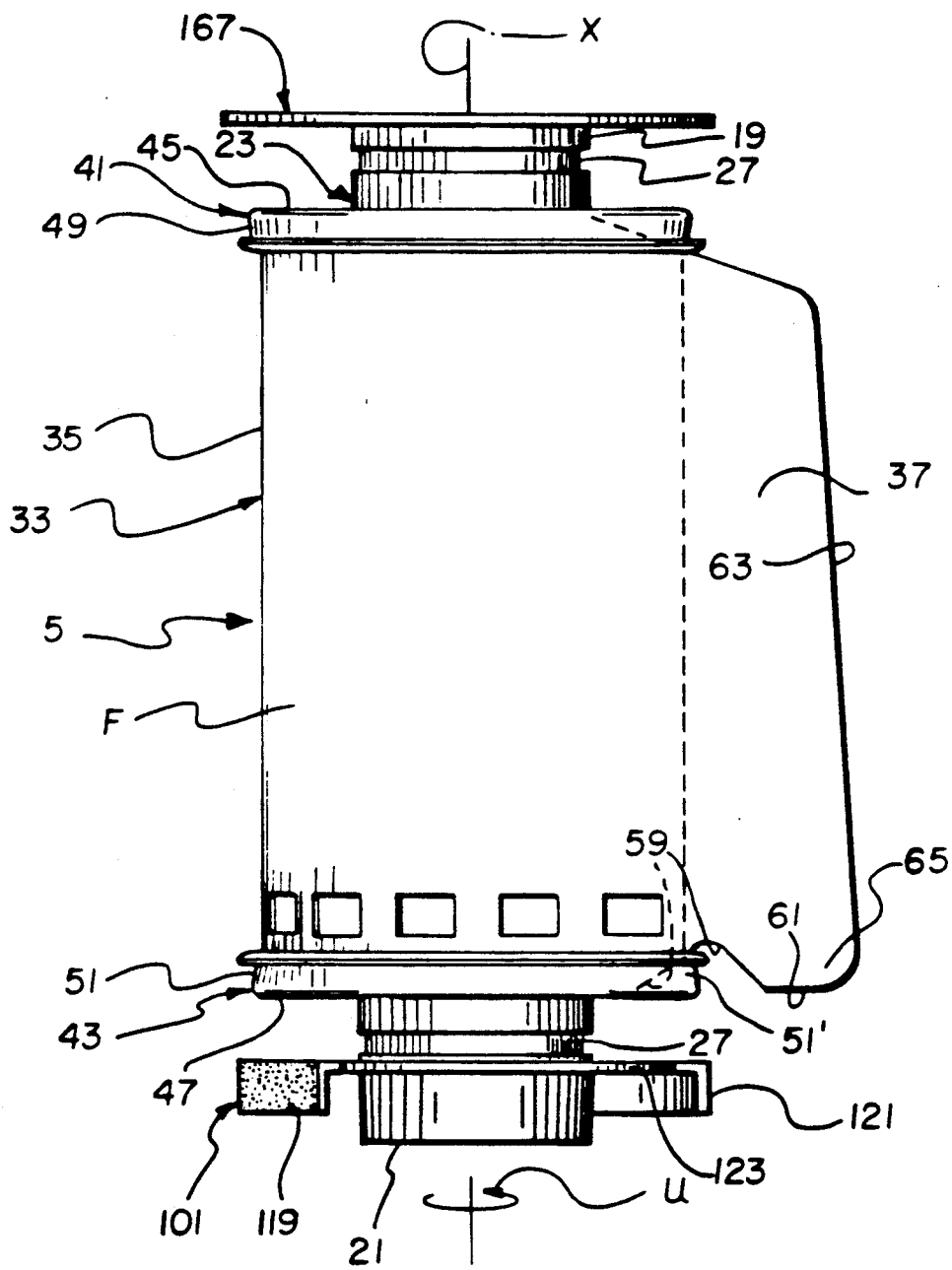
FIGS. 10 and 11 are elevation views similar to FIGS. 8 and 9, illustrating the manner in which the film roll is unwound from the film spool.

When the leading end 37 of the film leader (outermost convolution) 35 is advanced over the stripper-guide 68 responsive to rotation of the spool core 23 in the unwinding direction U, the longitudinal edges 53 and 55 of the leader start to gently flex respective arcuate portions of the two flanges 41 and 43 away from one another, i.e. farther apart, first to allow the notch 59 to separate from the lip section 51', and then to allow successive longitudinal sections of the leader to uncoil from between the flanges and exit to the outside of the cassette shell 3. See FIGS. 10 and 11. The flexing of the flanges 41 and 43 occurs because the film width $W_F$ between the longitudinal film edges 53 and 55 is slightly greater than the axial spacing $A_S$ between the annular lips 49 and 51. Moreover, successive convolutions of the film roll 33 have a resistance to transverse bowing that is greater than the resistance of the flanges 41 and 43 to be flexed. Two pairs of flat curved bearing members 69 project from the interior walls 58 of the respective shell halves 7 and 9 to lie flatly against successive arcuate portions of the two disks 45 and 47 as the flanges 41 and 43 are flexed away from one another, to only allow those flange portions separated from the bearing members to be flexed farther apart. See FIGS. 1, 2 and 4. The bearing members 69 are positioned relatively remote from the film passageway 25. Thus, the leader 35 is only allowed to uncoil from between the flanges 41 and 43 relatively close to the passageway 25. See FIG. 7.

A film flattening rib 71 projects from the interior wall 58 of the cassette half 9 in the vicinity of the inner entrance to the film passageway 25 and the stripper-guide 68 to support successive longitudinal sections of the film leader 35, beginning with its leading end 37, substantially flat widthwise as those sections are freed from the flanges 41 and 43, to facilitate movement of the leading end into the passageway. See FIG. 7. The light-trapping plush 31 within the film passageway 25 is elevated along the passageway slightly beyond a longitudinal center line L of the passageway. The film flattening rib 71 as shown in FIG. 4 projects almost to the center line L in order to support successive sections of the film leader 35 substantially flat at the center line. Preferably, the film-supporting tip or longitudinal edge of the flattening rib 71 is spaced 0.005"–0.030" short of the center line L.

Two substantially parallel curved film supporting ribs 75 and 76 project from the interior wall 58 of the cassette half 7 to longitudinally extend from the film flattening rib 71 to part-way between the pair of bearing members 69 which project from the same wall. See FIGS. 1, 3, and 4. The film supporting ribs 75 and 76 longitudinally extend the entire location at which the film leader (outermost convolution) 35 can escape the confinement of the flanges 41 and 43, when the leader axially flexes the flanges away from one another. The film supporting ribs 75 and 76 as shown in FIG. 3 are positioned to be slightly spaced from the film leader 35, when the leader is confined within the annular lips 49 and 51. Another film supporting rib 77 Projects from the interior wall 58 of the cassette half 7, opposite the stripper-guide 68. The other rib 77 is substantially parallel to and shorter than the first-two ribs 75 and 76. All three of the ribs 75–77 longitudinally extend perpendicular to and adjoin the flattening rib 71. See FIG. 1.

Figure 6:
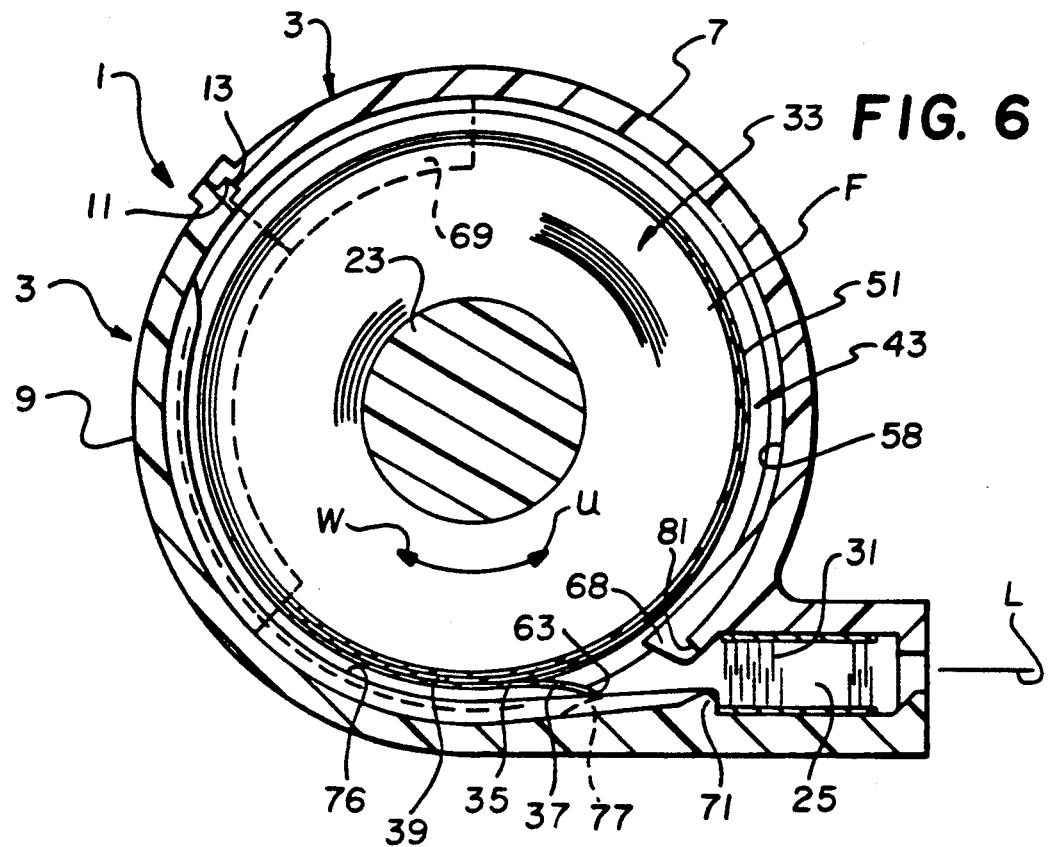
Figure 7:
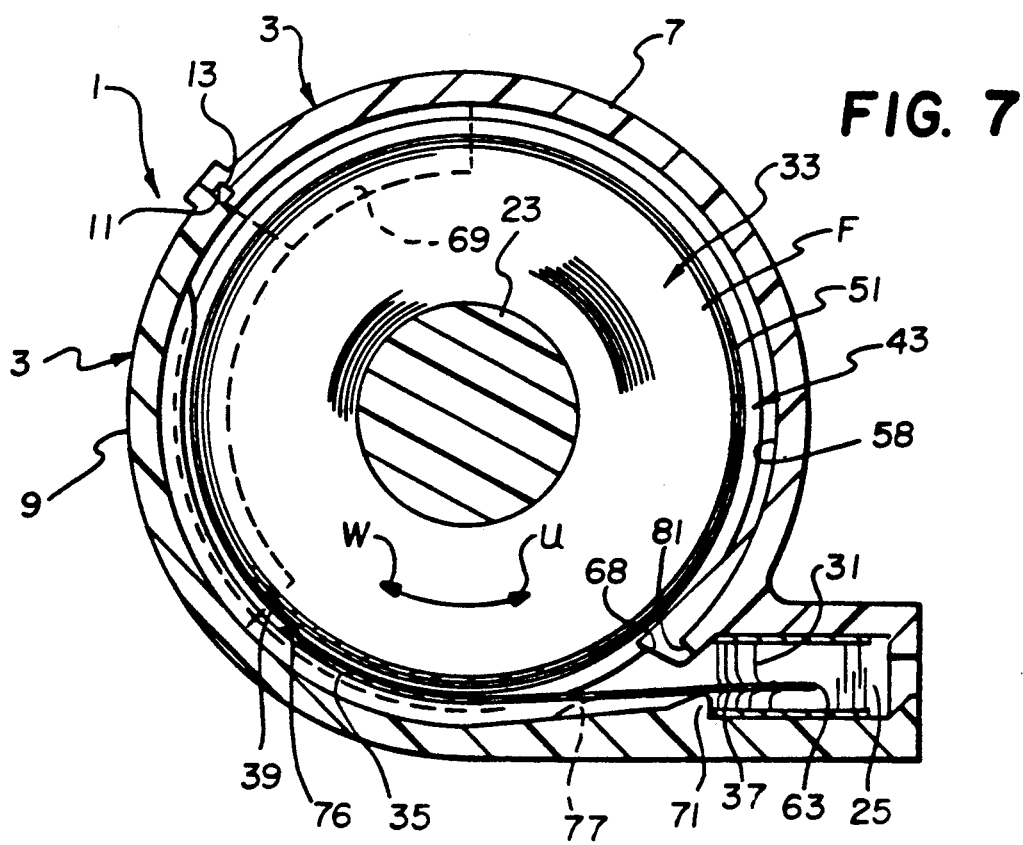
Figure 11:
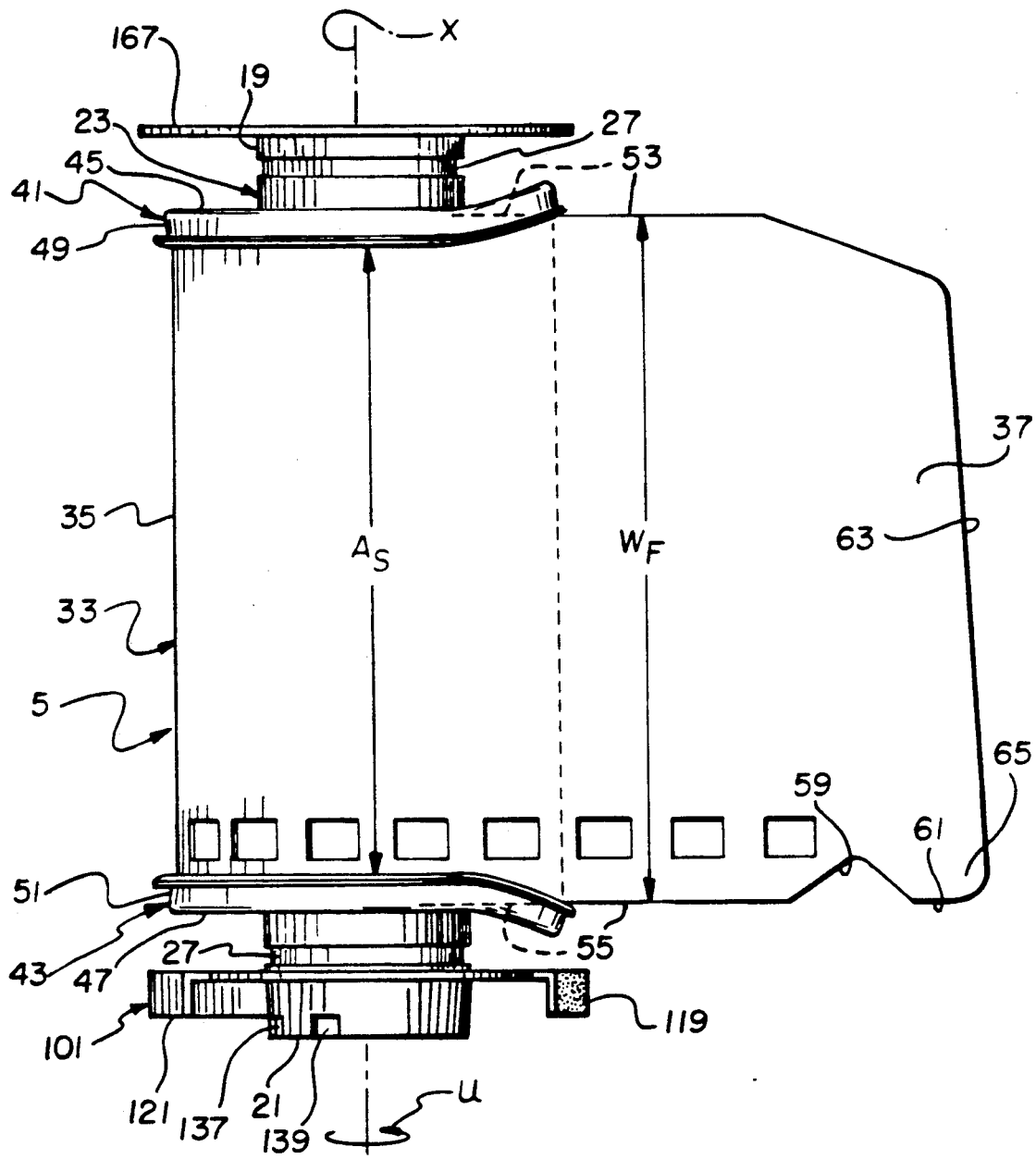

When the spool core 23 is initially rotated in the film unwinding direction U, the two flanges 41 and 43 momentarily tend to remain stationary and the film roll 33, since its inner end is attached to the spool core, will expand radially or clock-spring to force the film leader (outermost convolution) 35 firmly against the annular lips 49 and 51 of the flanges. Generally however, before the film roll 33 can be expanded radially to the extent a non-slipping relation would be created between the film leader (outermost convolution) 35 and the annular lips 49 and 51 as in cited U.S. Pat. Nos. 4,834,306 and No. 4,848,693, the hook-like members 67 will have moved along the respective slots 66 into engagement with the two flanges 41 and 43 to fix the flanges to the spool core. Then, further rotation of the spool core 23 will similarly rotate the flanges 41 and 43. As a result, the leading end 37 of the film leader (outermost convolution) 35 will be advanced over the shorter rib 77 and the stripper-guide 68, causing successive arcuate portions of the flanges 41 and 43 to be flexed away from one another as shown in FIG. 11. This first allows the notch 59 to separate from the lip section 51', and then it allows successive longitudinal sections of the film leader 35 to exit from between the flanges to the outside of the cassette shell 3. Since the stripper-guide 68 initially picks up the leading end 37 of the film leader 35 close to its forward-most tip 65, the forward edge 63 of the leading end will move against the film flattening rib 71 as shown in FIG. 6.

When the film leader 35 is thrust through the film passageway 25 to the outside of the cassette shell 3, the passageway due to the plush material 31 may present some very slight resistance to outward movement of the leader. This resistance might cause the leader 35 to further flex the flanges 41 and 43 away from one another to, in turn, allow more of the leader to uncoil lengthwise from between the flanges. If the two ribs 75 and 76 were omitted from the shell half 9, the leader 35 might uncoil against the interior wall 58 of the shell half. As a result, increased torque would be required to rotate the spool core 23 in the film unwinding direction U. However, the two ribs 75 and 76 serve to severely limit the extent to which the leader 35 can uncoil from between the flanges 41 and 43.

If the spool core 23 is rotated in the film winding direction W after some length of the filmstrip F has been advanced from the cassette shell 3, the spool core is free to rotate relative to the two flanges 41 and 43 because the hook-like members 67 can move along the respective slots 66 out of engagement with the flanges. This permits the flanges 41 and 43 to be independently rotated in the winding direction W, though at a slower speed than the spool core 23 is rotated in that direction. Each of the hook-like members 67 may back out of one of the slots 66 and into the next slot during continued rotation of the spool core 23 in the winding direction W. At the same time, the filmstrip F will be rewound onto the spool core 23 between the flanges 41 and 43.

The Film Exposure Status Indicator/Lock-Out Means Of The Film Cassette

Figure 14:
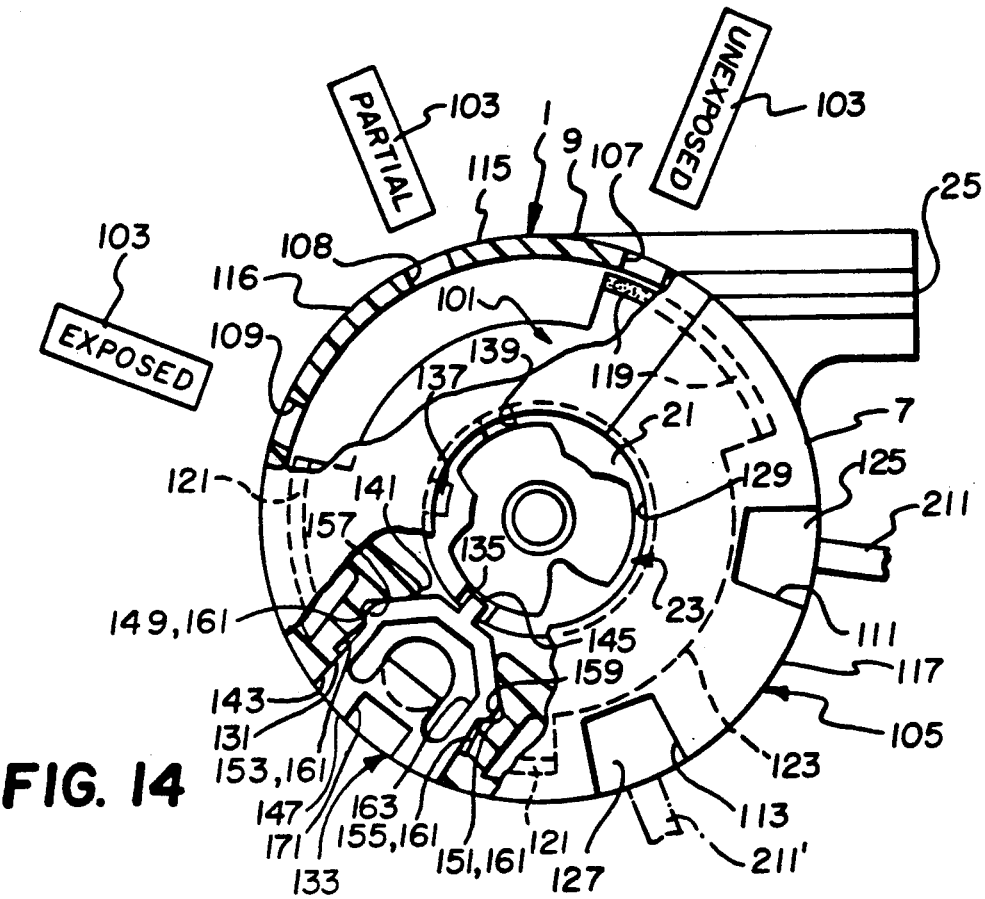
FIG. 14 is an end view of the film cassette, illustrating a film exposure status indicator in an unexposed position.
Figure 15:
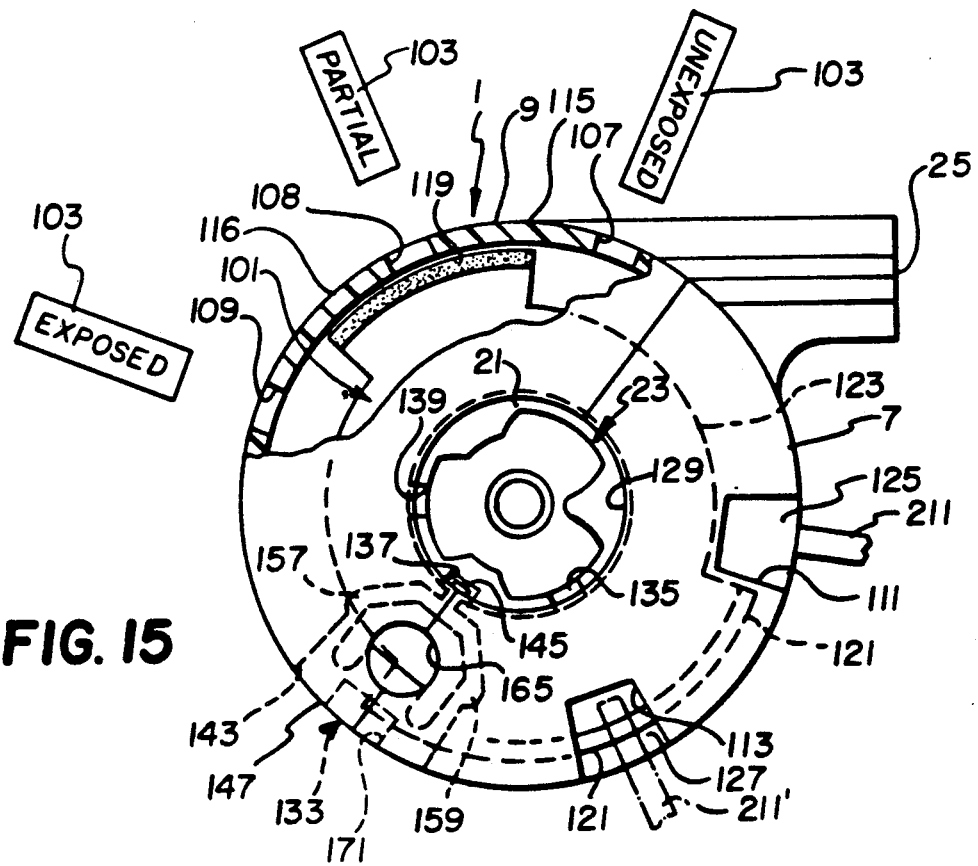
FIGS. 15 and 16 are end views similar to FIG. 14, illustrating the status indicator moved to partly exposed and fully exposed positions, respectively.
Figure 16:
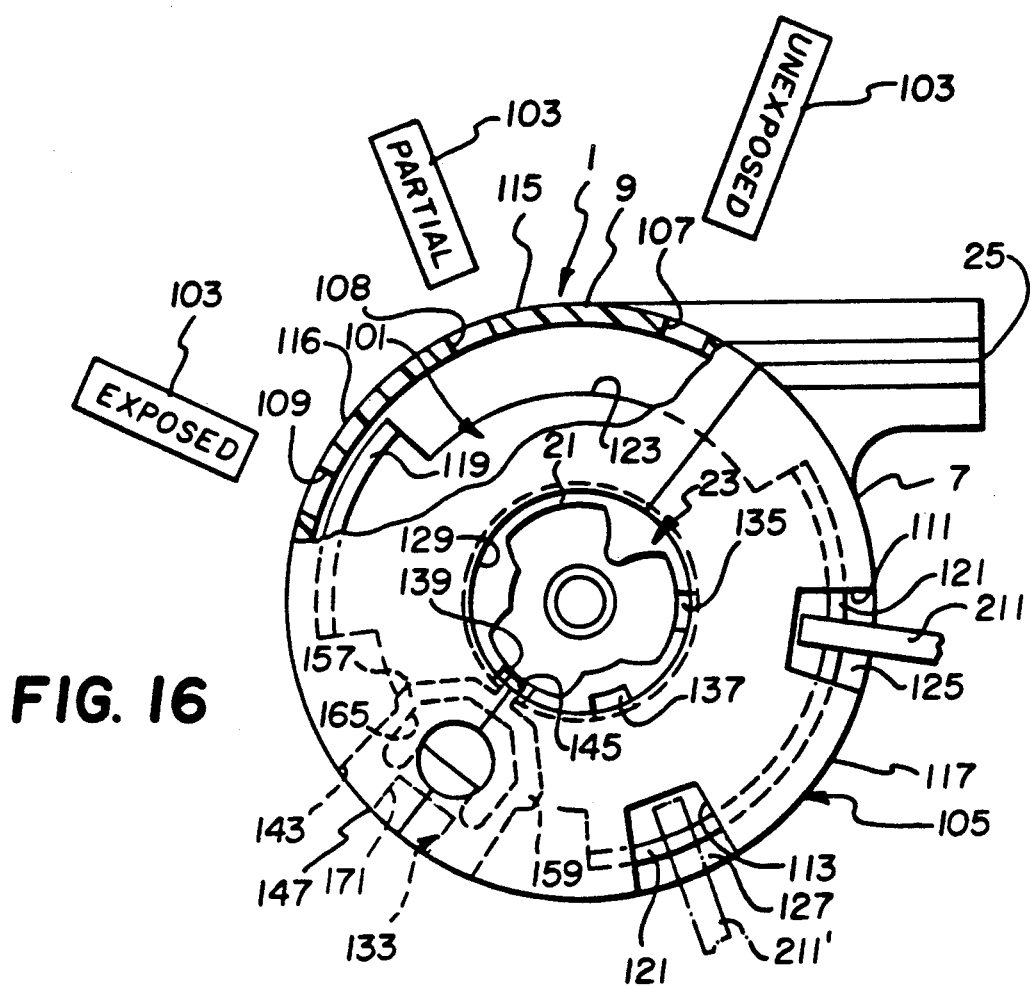
Figure 17:
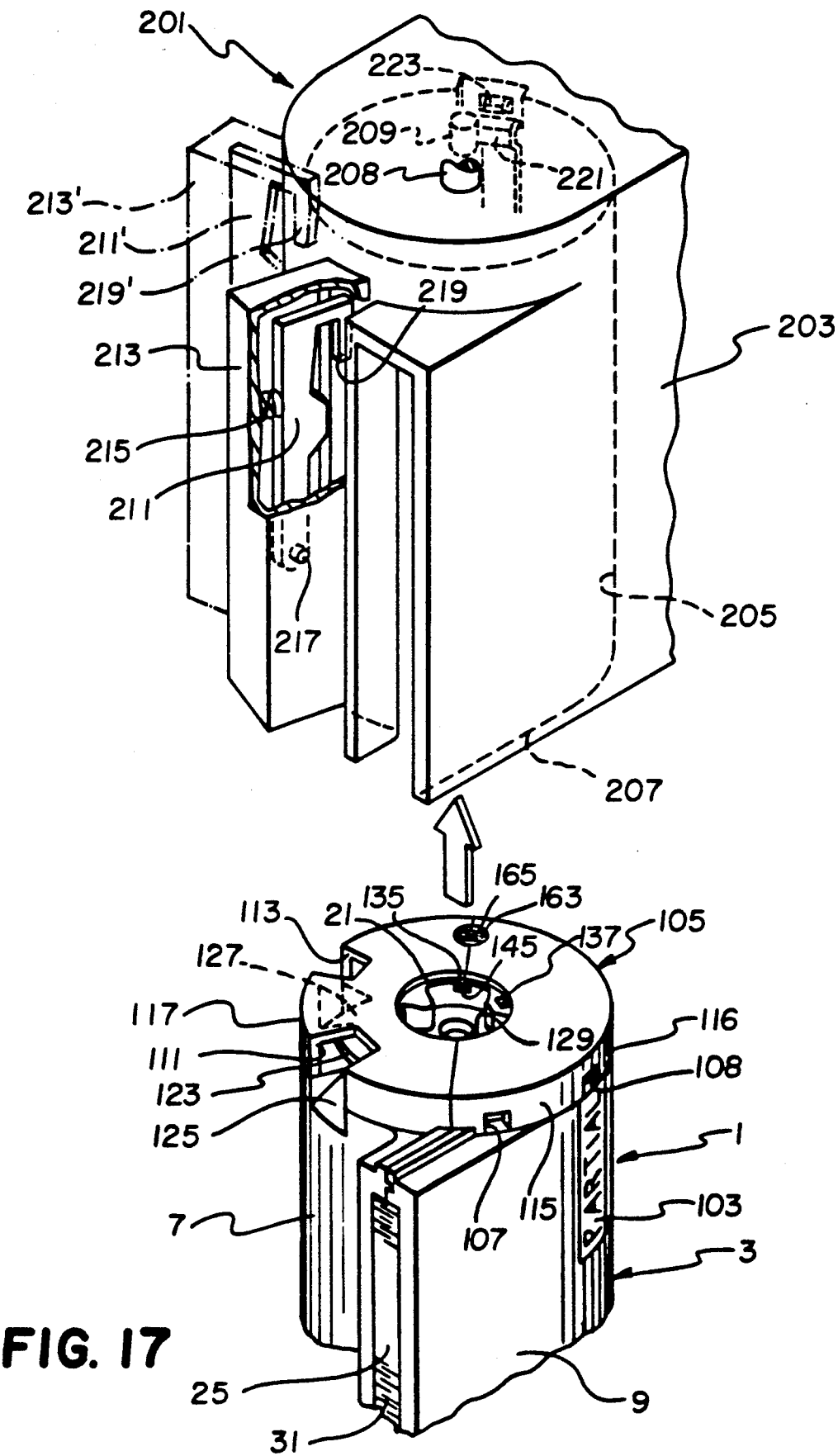
FIG. 17 is a perspective view of the film cassette and of camera apparatus including respective sensing/blocking members that cooperate with the status indicator to prevent loading of the cassette into a loading chamber when the status indicator is in its partly exposed and fully exposed positions or alternatively only in its fully exposed position, and a sensing member for detecting the presence or absence of a film speed indication notch in a spool lock of the film cassette.
Figure 18:
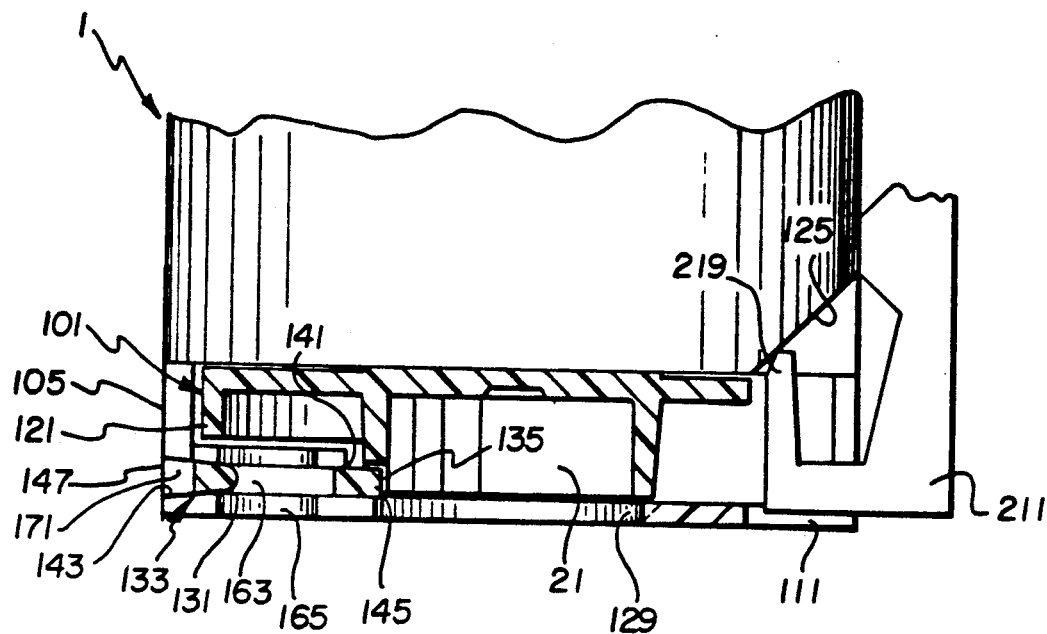
FIGS. 18 and 19 are schematic views partly in section illustrating interaction of the sensing/blocking members and the status indicator when the status indicator is in its unexposed position, and only in FIG. 19 illustrating interaction of the sensing member and the film speed indication notch.

FIGS. 1, 12 and 14 depict a film exposure status indicator/lock-out means 101 integrally formed with the longer open-end piece 21 of the spool core 23. Respective indicia "UNEXPOSED", "PARTIAL" and "EXPOSED" indicating that the filmstrip F is unexposed, i.e. all of the available film frames are unexposed, is only partly exposed, i.e. only some of the available film frames are exposed, and is substantially exposed, i.e. all of the film frames are exposed, are printed on a label(s) 103 adhered to the cassette half 9. See FIGS. 14 and 17. An end cap or shield 105 comprising part of the cassette shell 3 covers the indicator/lock-out means 101. The end cap 105 has respective circumferential indicator windows 107, 108 and 109 aligned with the three indicia "UNEXPOSED" "PARTIAL" and "EXPOSED" and has a pair of separate lock-out windows 111 and 113. The three indicator windows 107, 108 and 109 are spaced apart via arcuate side portions 115 and 116 of the end cap 105, and the two lock-out windows 111 and 113 are spaced apart via an arcuate side portion 117 of the end cap. The indicator/lock-out means 101 includes a peripheral arcuate indicator rib 119, a peripheral arcuate lock-out rib 121 and a peripheral arcuate cut-out 123 which extends between the two ribs. The indicator rib 119 preferably has a color such as red which is different than the color of the end cap 105. When the indicator/lock-out means 101 is rotationally oriented relative to the end cap 105 as shown in FIGS. 14, 17 and 18, it is in an unexposed/non-lockout position in which the indicator rib 119 is at the indicator window 107 to indicate the filmstrip F is unexposed and the cut-out 123 is in the lock-out windows 111 and 113 to uncover respective cam or beveled surfaces 125 and 127 formed on the cassette half 7 adjacent the lock-out windows. When the indicator/lock-out means 101 is rotationally oriented relative to the end cap 105 as shown in FIG. 15, it is in a partly exposed/single lock-out position in which the indicator rib 119 is at the indicator window 108 to indicate the filmstrip F is partly exposed, the lock-out rib 121 is in the lock-out window 113 to cover the cam surface 127 and the cut-out 123 is in the lock-out window 111 to uncover the cam surface 125 and is at the indicator window 107. When the indicator/lock-out means 101 is rotationally oriented relative to the end cap 105 as shown in FIG. 16, it is in a fully exposed/double lock-out position in which the indicator rib 119 is at the indicator window 109 to indicate the filmstrip F is substantially exposed, the lock-out rib 121 is in the lock-out windows 111 and 113 to cover the cam surfaces 125 and 127 and the cut-out 123 is at the indicator windows 107 and 108.

The end cap 105 has a central opening 129 aligned with the longer open-end piece 21 of the spool core 23, and a radial slot 131 in which a locking member 133 is supported for movement in opposite directions between a locking position for engaging the longer open-end piece at anyone of three radial notches or detents 135, 137 and 139 formed in the longer open-end piece and a non-locking position separated from the notches to thereby disengage the longer open-end piece. See FIGS. 1 and 14–17. When the indicator/lock-out means 101 is in its unexposed/non-lockout position as shown in FIG. 14, the locking member 133 engages the longer open-end piece 21 at the radial notch 135. When the indicator/lock-out means 101 is in its partly exposed/single lock-out position as shown in FIG. 15, the locking member 133 engages the longer open-end piece 21 at the radial notch 137. When the indicator lock-out means 101 is in its fully exposed/double lock-out position as shown in FIG. 16, the locking member 133 engages the longer open-end piece 21 at the radial notch 139. Thus, the spool core 23 can be rotationally arrested with the indicator/lock-out means 101 in anyone of the unexposed, partly exposed and fully exposed positions.

The radial slot 131 of the end cap 105 has a pair of opposite inward and outward openings 141 and 143, a first (141) of which opens to the interior of the cassette shell 3 and a second (143) of which opens to the exterior of the shell. The locking member 133 has a Pair of opposite ends 145 and 147, a first (145) of which protrudes from the first opening 141 to engage anyone of the three radial detents 135, 137 and 139 when the locking member is in the locking position and a second (147) of which protrudes from the second opening 143 when the locking member is in the non-locking position to permit it to be pushed further into the radial slot 131 to move the locking member to the locking position. The radial slot 131 and the locking member 133 are relatively dimensioned to permit only the one end 145 to protrude from the inward opening 141 when the locking member is in the locking position and to permit only the other end 147 to protrude from the outward opening 143 when the locking member is in the non-locking position.

Cooperating or securement means are formed on the end cap 105 at the radial slot 131 and on the locking member 133 for fixing the end cap and the locking member to each other when the locking member is in the locking and non-locking positions to prevent its movement between the two positions and are releasable when the locking member is in the locking and non-locking positions to permit its movement between the two positions. Specifically, first and second pairs 149, 151 and 153, 155 of recesses in the end cap 105 open to the radial slot 131, and a pair of resiliently flexible tabs 157, 159 of the locking member 133 are normally or inherently biased to move into the first pair of recesses when the locking member is in the locking position and to move into the second pair of recesses when the locking member is in the non-locking position. The first and second pairs of recesses 149, 151 and 153, 155 each include an inclined edge 161 that operates as a cam edge to flex the tabs 157, 159 out of the respective recesses, i.e. toward each other, responsive to movement of the locking member out of the locking and non-locking positions. See FIGS. 14, 14A, 15 and 16. A central opening 163 in the locking member 133 provides a void which facilitates flexing of the tabs 157, 159 towards each other. The central opening 163 is located beneath an access opening 165 in the end cap 105 when the locking member 133 is in the locking position to permit the locking member to be engaged through the access opening at the central opening to move the locking member to the non-locking position. See FIGS. 1 and 17.

The Film Information Disk Of The Film Cassette

A film information disk 167 is coaxially fixed to the shorter end Piece 19 of the spool core 23. See FIGS. 1, 2 and 12. The information disk 167 has an annular array of optically readable information comprising a bar code 169 consisting essentially of a series of radially arranged photoreflective and non-reflective bits. Details of the bar code and its relation to the indicator/lock-out means 101 are disclosed in commonly assigned copending application Ser. No. 07/560,921, filed Jul. 31, 1990.

The Film Speed Indicator Means Of The Film Cassette

Figure 13:
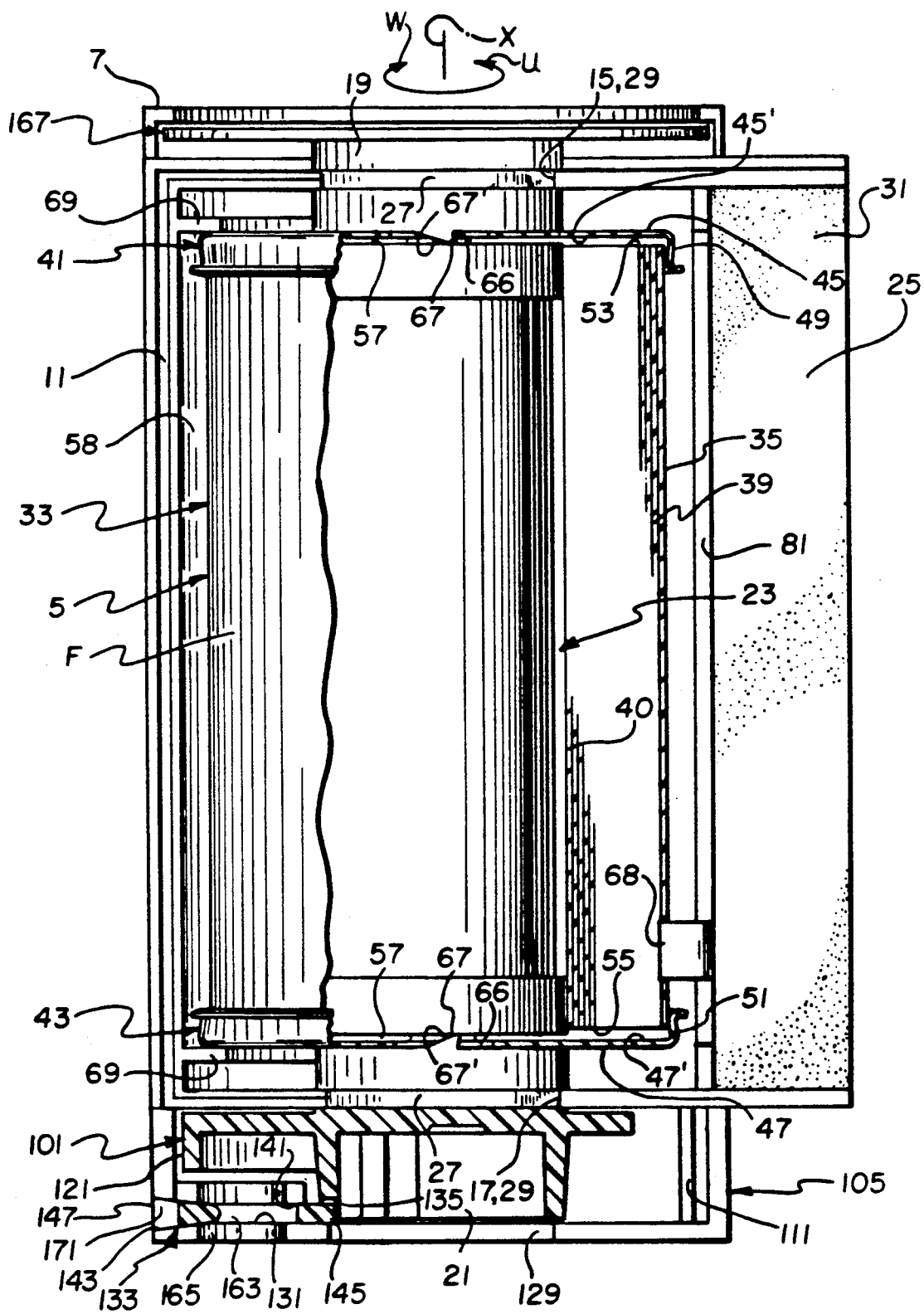
FIG. 13 is an elevation view partly in section of the film roll and the film spool, illustrating the manner in which one of a pair of film confining flanges of the spool may be fixed to the spool for concurrent rotation with the spool.
Figure 14A:
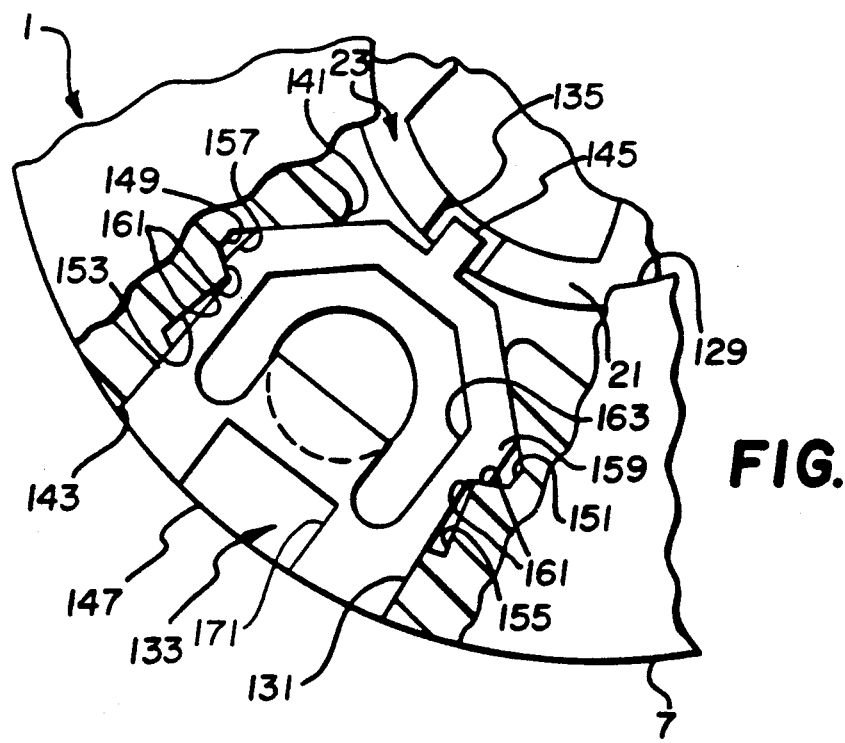
FIG. 14A is a detailed view of a portion of FIG. 14.

As shown in FIGS. 1, 13 and 14A, for example, the locking member 133 includes at its second end 147 a film speed indicator notch 171 which is intended to serve as a detectable indication that the speed of the filmstrip F is ISO 400 or greater. Conversely, the absence of the notch 171 at the second end 147 of the locking member 133 is intended to serve as a detectable indication that the speed of the filmstrip F is less than ISO 400. Thus, the presence or absence of the notch 171 at a single unique location on the locking member 133 may be used to provide a single-indicia binary "1" or "0" encodement relating to film speed.

In place of having or not having the film speed indicator notch 171 at only one location on the locking member 133, the notch might be present or absent at respective locations on the locking member to provide a multi-indicia binary encodement comprising a combination of "0"s and "1"s. See prior art U.S. Pat. No. 3,444,795, granted May 20, 1969, for an example of notch-coding to indicate film speed.

Camera Apparatus

Camera apparatus 201 is shown in FIG. 17 for use with the indicator/lock-out means 101 and the film speed indicator notch 171 of the film cassette 1. The camera apparatus 201 includes a camera body portion 203 having a loading chamber 205 with an entry opening 207 for receiving the film cassette 1 endwise into the chamber. A conventional spindle 208 extends into the bottom of the loading chamber 203 for receipt in the central opening 129 of the end cap 105 to engage and rotatably support the spool core 23. A cam pin 209 is located at the bottom of the loading chamber 20 for receipt through the access opening 165 in the end cap 105 into the central opening 163 in the locking member 133 to move the locking member automatically from its locking position shown in FIG. 18 to its non-locking position shown in FIG. 19. Thus, the indicator/lock-out means 101 (and the spool core 23) will be permitted to rotate in the winding direction W from the unexposed position shown in FIG. 14 to the partly exposed position shown in FIG. 15 and from the partly exposed position to the fully exposed position shown in FIG. 16. Also, the film speed indicator notch 171 will be located outside the cassette shell 3 as shown in FIG. 19.

A sensing/blocking member 211 located within a slot 213 opening to the loading chamber 205 is urged by a helical compression spring 215 to pivot clockwise in FIG. 17 about a support pin 217 until a hook-like end 219 of the sensing/blocking member protrudes into the loading chamber. In this normal position, the sensing/blocking member 211 is disposed to locate its hook-like end 219 for abutment with the cam surface 125 of the cassette half 7 when the cut-out 123 is in the lock-out window 111 or with the lock-out rib 121 when the rib is in the lock-out window. See FIGS. 18-20. If the film cassette 1 is initially inserted into the loading chamber 205, with the indicator/lock-out means 101 in its unexposed or partly exposed position as shown in FIGS. 14 and 15, the cam surface 125 is not covered by the lock-out rib 121 and will contact the hook-like end 219 of the sensing/blocking member 211 to cam or pivot the latter member out of the way of the cam surface to allow the film cassette to be further inserted into the loading chamber. See FIGS. 18 and 19. However, should the film cassette 1 be initially inserted into the loading chamber 205, with the indicator/lock-out means 101 in its fully exposed position as shown in FIG. 16, the lock-out rib 121 will cover the cam surface 125 and be caught by the hook-like end 219 of the sensing/blocking member 211 to prevent further insertion of the film cassette into the loading chamber. See FIG. 20. Thus, camera apparatus with the sensing/blocking member 211 is intended to receive the film cassette 1 with fresh unexposed or partly exposed film.

An alternate embodiment of the sensing/blocking member 211 is shown in FIG. 17. In this embodiment, the reference numbers 211', 213', and 219' correspond to the reference numbers 211, 213 and 219. If the film cassette 1 is initially inserted into the loading chamber 205, with the indicator/lock-out means 101 in its unexposed position as shown in FIG. 14, the cam surface 127 of the cassette half 7 is not covered by the lock-out rib 121 and will contact the hook-like end 219' of the sensing/blocking member 211' to cam or pivot the latter member out of the way of the cam surface to allow the film cassette to be further inserted into the loading chamber. However, should the film cassette 1 be initially inserted into the loading chamber 205, with the indicator/lock-out means 101 in its partly exposed or fully exposed position as shown in FIGS. 15 and 16, the lock-out rib 121 will cover the cam surface 127 and be caught by the hook-like end 219' of the sensing/blocking member 211' to prevent further insertion of the film cassette into the loading chamber. Thus, camera apparatus with the sensing/blocking member 211' is intended to receive the film cassette 1 only with fresh unexposed film.

Figure 19:
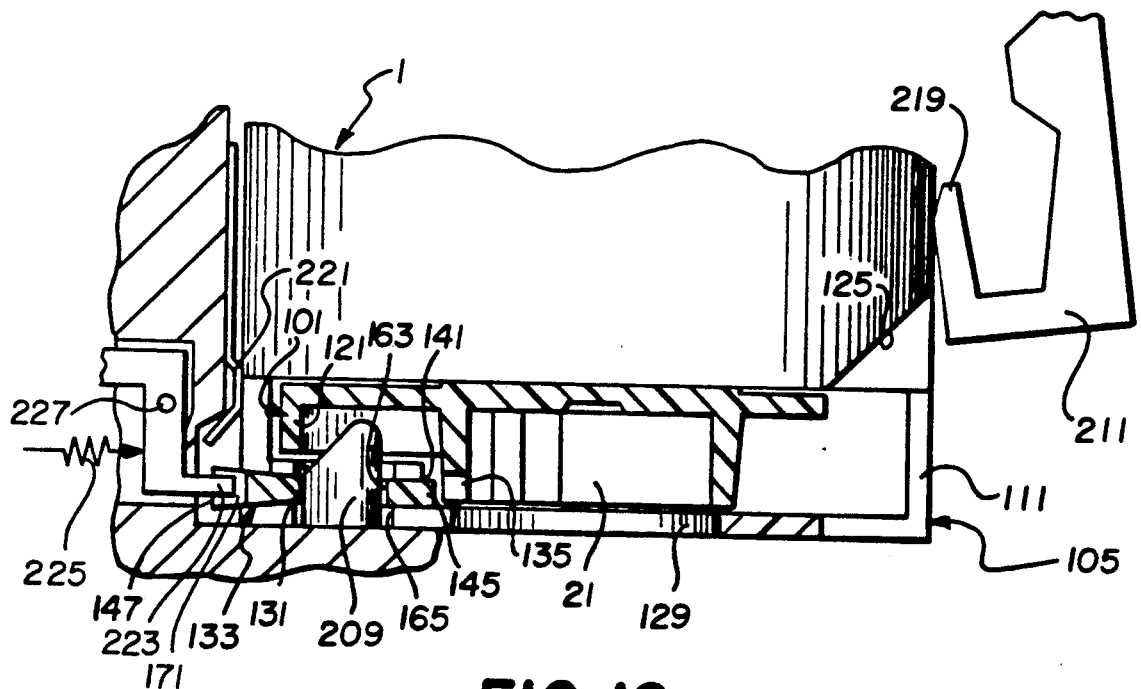
Figure 20:
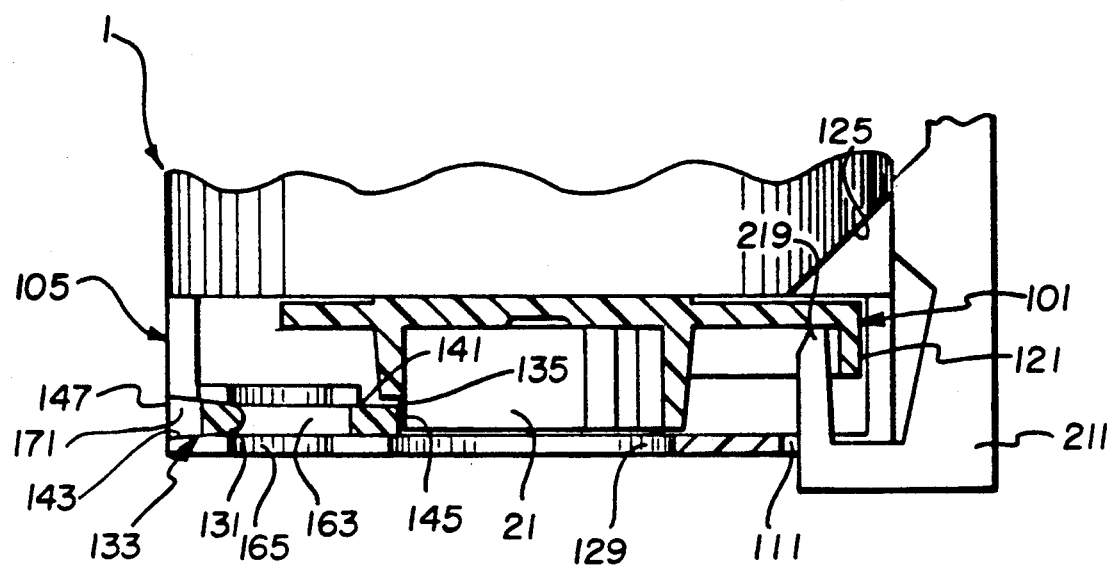
FIG. 20 is a schematic view similar to FIG. 19 illustrating interaction of the sensing/blocking members and the status indicator when the status indicator is in its fully exposed position.

A sensing member 223 as shown in FIG. 19 is urged by a helical compression spring 225 to pivot counter-clockwise about a support pin 227 to fall into the film speed indication notch 171 in the locking member 133 only when the locking member is in its non-locking position. Conversely, in the absence of the notch 171 in the locking member 133 the sensing member 223 would remain in place when the locking member is in its non-locking position. Thus, the position of the sensing member can be used as a measure of whether the speed of the filmstrip F is ISO 400 or greater or is less than ISO 400 in accordance with the presence or absence of the notch 171 in the locking member 133.

As shown in FIGS. 17 and 19, a leaf spring 221 connected to the inside of the loading chamber 205 proximate the cam pin 209 is intended to push against the end 147 of the locking member 133 when the film cassette 1 is initially withdrawn from the chamber. The leaf spring 221 moves the locking member 133 from its non-locking position to its locking position before the spool core 23 can be separated from the spindle 208.

The invention has been described with reference to a preferred embodiment. However, it will be appreciated that variations and modifications can be effected within the ordinary skill in the art without departing from the scope of the invention. For example, in place of the film speed indicator notch 171, an electrically conductive indicator such as shown in U.S. Pat. Nos. 4,173,401, granted Nov. 6, 1979, and No. 4,024,557, granted May 17, 1977, may be used. Camera apparatus for detecting the electrically conductive indicator is shown in the patents.

We claim:

1. A film cassette comprising an integral shell housing a filmstrip and film speed related indicator means separate from said filmstrip for providing a film speed related indication in connection with a film speed of the filmstrip, is characterized in that:

a shield forming part of said shell is configured for concealing said film speed related indicator means at least to prevent the indicator means from being detected and for allowing the indicator means to be moved to reveal the indicator means at least to permit it to be detected; and support means forming part of said shell supports said film speed related indicator means for movement relative to said filmstrip between a storage position in which the shield conceals the indicator means and a use position in which the indicator means is revealed.

2. A film cassette as recited in claim 1, wherein said shell includes integral means supporting a spool inside the shell for rotation to unwind a filmstrip coiled about said spool to permit movement of the filmstrip to the exterior of the shell, and said film speed related indicator means includes locking means for arresting said spool whenever the indicator means is in the storage position.

3. A film cassette as recited in claim 2, wherein said spool is secured to a film exposure status indicator to support said status indicator for movement from an unexposed position for providing a visible indication that a filmstrip coiled about the spool is unexposed to an exposed position for providing a visible indication that the filmstrip is exposed, and said locking means includes integral means for arresting said film exposure status indicator in the unexposed and exposed positions whenever said film speed related indicator means is in the storage position and for not arresting the status indicator when the indicator means is in the use position.

4. A film cassette comprising an integral shell housing a filmstrip, and film speed related indicator means apart from said filmstrip for providing a film speed related indication in connection with a film speed of the filmstrip, is characterized in that:

said cassette includes integral means supporting said film speed related indicator means for movement with respect to said filmstrip between a storage position in which the indicator means cannot be detected to provide a film speed related indication and a use position in which the indicator means can be detected to provide the indication.

5. A film cassette as recited in claim 4, wherein said integral means supports said film speed related indicator means to protrude from said shell when the indicator means is in the use position and not to protrude from the shell when the indicator means is in the storage position.

6. A film cassette comprising a shell for housing filmstrips of various film speeds, and a film exposure status indicator supported for movement to respective exposure status positions corresponding to the exposure condition of a filmstrip housed in said shell, is characterized in that:
- locking means is supported for movement to arrest said film exposure status indicator in any one of the exposure status positions and to release the status indicator; and
- film speed related indicator means is located on said locking means for providing a film speed related indication, regarding the film speed of a filmstrip housed in said shell, that is not detectable when the locking means is arresting said film exposure status indicator and is detectable when the locking means has released the status indicator.

7. A film cassette comprising a spool supported inside a shell for rotation to unwind a filmstrip coiled about said spool to permit movement of the filmstrip to the exterior of the shell, is characterized in that:
- locking means apart from said filmstrip is supported for movement relative to the filmstrip to arrest said spool and to release the spool; and
- film speed related indicator means is located on said locking means for providing a film speed related indication, regarding the film speed of the filmstrip, that is not detectable when the locking means is arresting the spool and is detectable when the locking means has released the spool.

8. A film cassette comprising a spool supported inside a shell for rotation to thrust a filmstrip coiled about said spool to the exterior of said shell whether said filmstrip is unexposed or is partly exposed, and a film exposure status indicator secured to said spool for rotation from a first position for providing a visible indication that said filmstrip is unexposed to respective second and third positions for providing visible indications that said filmstrip is only partly exposed or is substantially exposed, is characterized in that:
- spool locking means apart from said filmstrip is supported for movement relative to the filmstrip to arrest said spool with said film exposure status indicator in the first, second or third position, and to release the spool; and
- film speed related indicator means is located on said spool locking means for providing a film speed related indication, regarding the film speed of the filmstrip, that is not detectable when the locking means is arresting the spool and is detectable when the locking means has released the spool.

9. A film cassette as recited in claim 8, wherein said film speed related indicator means is located to protrude from said shell when said spool locking means has released said spool and not to protrude from the shell when the locking means is arresting the spool.

10. A film cassette comprising a shell for housing filmstrips of various film speeds, and a film exposure status indicator supported for movement to respective exposure status positions corresponding to the exposure condition of a filmstrip housed in said shell, is characterized by:
- locking means supported for movement to arrest said film exposure status indicator in any one of the exposure status positions and to release the status indicator;
- film speed related indicator means separate from a filmstrip housed in said shell for providing a film speed related indication, regarding the film speed of the filmstrip, that is capable of being detected; and
- concealment means arranged relative to said film speed related indicator means and to said locking means for preventing detection of the film speed related indication when said locking means is arresting said film exposure status indicator and not preventing detection of the film speed related indication when the locking means has released the status indicator.

11. A film cassette comprising a shell for housing filmstrips of various film speeds, and a film spool supported for rotation inside said shell, is characterized by:
- locking means supported for movement to arrest said film spool to prevent its rotation and to release the film spool to permit its rotation;
- film speed related indicator means separate from a filmstrip housed in said shell for providing a film speed related indication, regarding the film speed of the filmstrip, that is capable of being detected; and
- concealment means arranged relative to said film speed related indicator means and to said locking means for preventing detection of the film speed related indication when said locking means is arresting said film spool and not preventing detection of the film speed related indication when the locking means has released the film spool.

* * * * *